United States Patent
Kim et al.

(10) Patent No.: US 9,774,899 B2
(45) Date of Patent: Sep. 26, 2017

(54) METHOD FOR RECEIVING MEDIA AND DEVICE THEREOF

(71) Applicant: LG ELECTRONICS INC., Seoul (KR)

(72) Inventors: Kyungho Kim, Seoul (KR); Jinpil Kim, Seoul (KR); Waqar Zia, Munich (DE); Hyeonjae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/988,465

(22) Filed: Jan. 5, 2016

(65) Prior Publication Data
US 2016/0345041 A1 Nov. 24, 2016

Related U.S. Application Data

(63) Continuation of application No. 14/233,326, filed as application No. PCT/KR2012/005820 on Jul. 20, 2012, now Pat. No. 9,258,590.

(60) Provisional application No. 61/510,037, filed on Jul. 20, 2011, provisional application No. 61/522,250, filed on Aug. 11, 2011.

(51) Int. Cl.
| | |
|---|---|
| *H04N 7/173* | (2011.01) |
| *H04N 21/2662* | (2011.01) |
| *H04N 21/434* | (2011.01) |
| *H04N 21/4402* | (2011.01) |
| *H04N 21/647* | (2011.01) |
| *H04N 21/854* | (2011.01) |

(52) U.S. Cl.
CPC ..... *H04N 21/2662* (2013.01); *H04N 21/4344* (2013.01); *H04N 21/4346* (2013.01); *H04N 21/4402* (2013.01); *H04N 21/64792* (2013.01); *H04N 21/85403* (2013.01)

(58) Field of Classification Search
CPC combination set(s) only.
See application file for complete search history.

(56) References Cited

U.S. PATENT DOCUMENTS

| | | | |
|---|---|---|---|
| 6,522,694 B1 | 2/2003 | Ryan | |
| 2005/0055714 A1* | 3/2005 | Lee | H04H 20/28 725/54 |
| 2007/0147429 A1* | 6/2007 | Shi | G11B 20/1217 370/473 |
| 2009/0028081 A1* | 1/2009 | Song | H04L 45/74 370/310 |
| 2010/0226443 A1* | 9/2010 | Citta | H04N 21/23432 375/240.26 |

(Continued)

FOREIGN PATENT DOCUMENTS

| | | |
|---|---|---|
| JP | 2003-348540 A | 5/2003 |
| KR | 10-2000-0028930 A | 5/2000 |
| KR | 10-2006-0027346 A | 3/2006 |

*Primary Examiner* — Brian T Pendleton
*Assistant Examiner* — Alexander Gee
(74) *Attorney, Agent, or Firm* — Dentons US LLP

(57) ABSTRACT

A method for receiving media according to one embodiment comprises the following steps: selecting a receiving channel; receiving a media transport stream transmitted through the receiving channel; generating a media storage stream based on the received media transport stream; and recording the media storage stream. The media transport stream comprises at least one sync bite which represents data removed from the media transport stream.

18 Claims, 15 Drawing Sheets

(56) References Cited

U.S. PATENT DOCUMENTS

2011/0173209 A1\* 7/2011 Fortier ................ H03M 7/3086
707/747

\* cited by examiner

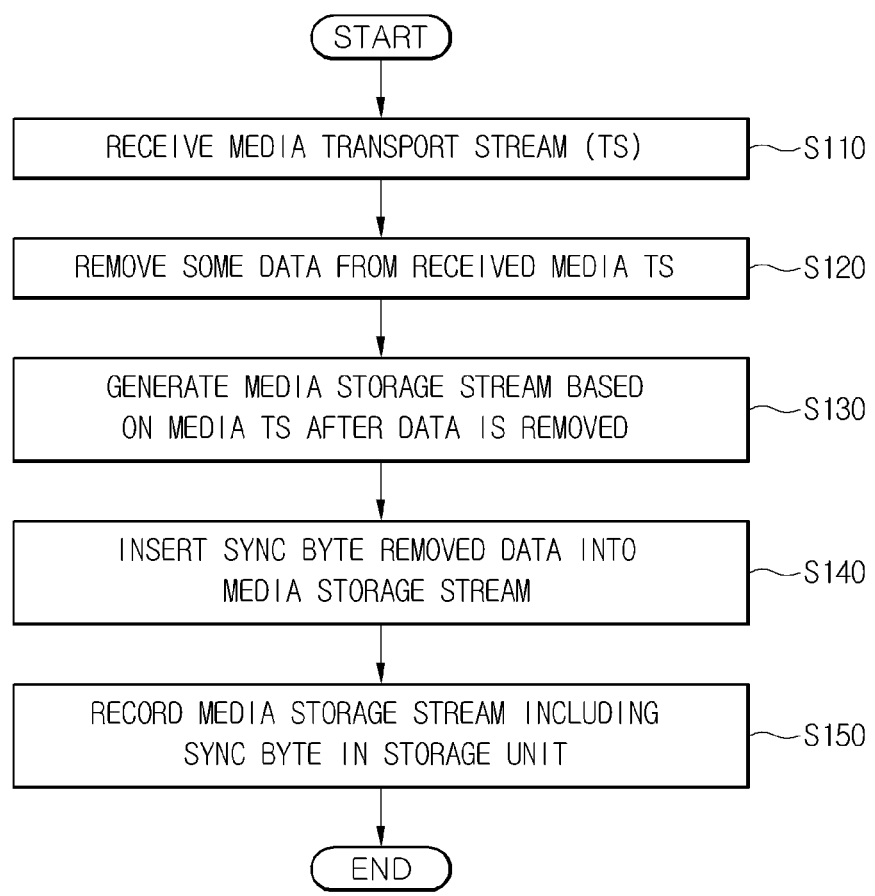

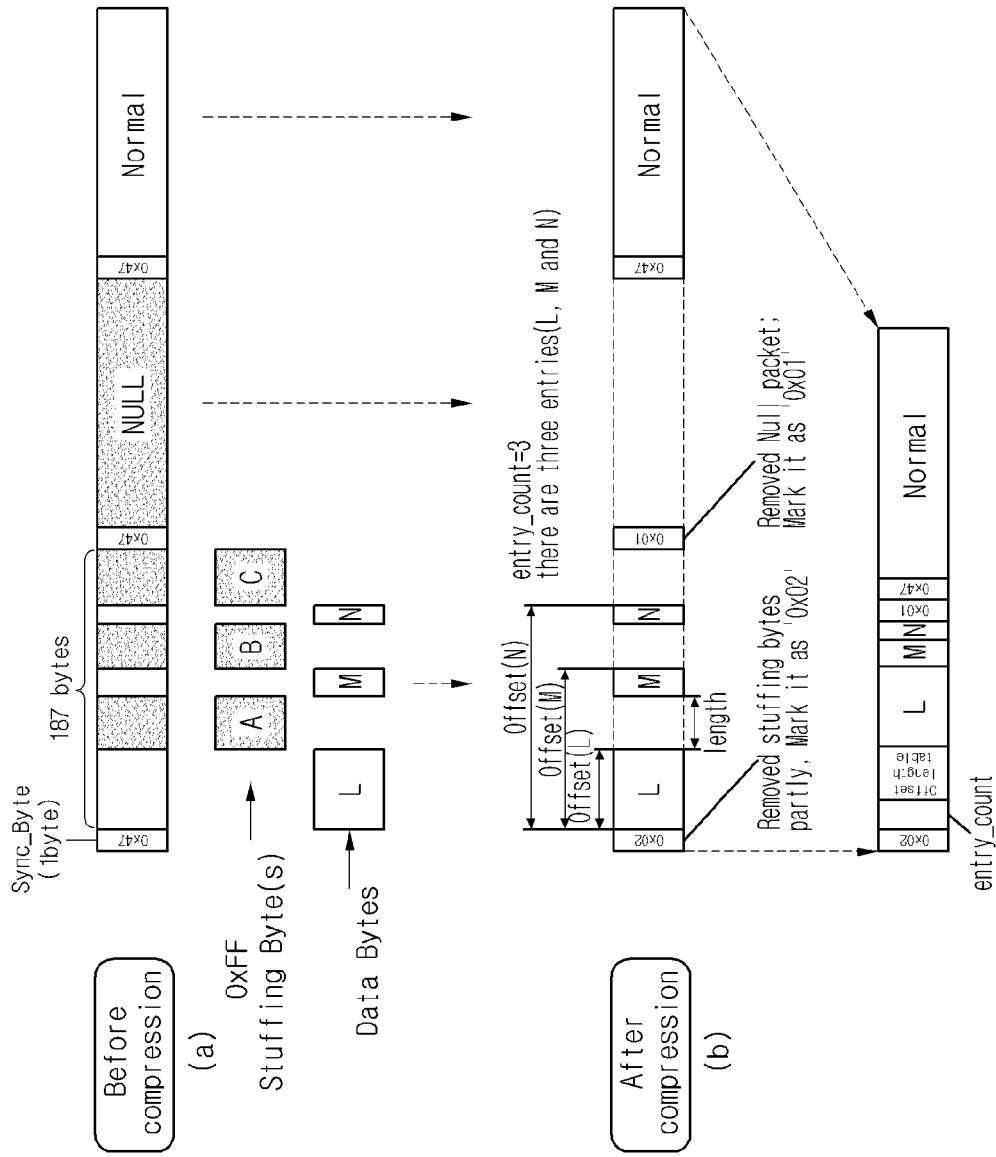

FIG.6

```
// Packet format
aligned(8) class MPEG2TSPacketRepresentation {
    uint(8)   precedingbytes[precedingbyteslen];
    uint(8) sync_byte;
    if (sync_byte == 0x47) {
        uint(8)      packet[187];
    } else if (sync_byte == 0x00 || sync_byte == 0x01) {
        uint(8)      headerdatalen;
        uint(4)      reserved;
        uint(4)      num_constructors;
        bit(1)       transport_error_indicator;
        bit(1)       payload_unit_start_indicator;
        bit(1)       transport_priority;
        bit(13)      PID;
        bit(2)       transport_scrambling_control;
        bit(2)       adaptation_field_control;
        bit(4)       continuity_counter;
        if (sync_byte == 0x00 && (adaptation_field_control == '10' ||
             adaptation_field_control == '11')) {
            uint(8)    adaptation_field[headerdatalen-3];
        }
        MPEG2TSConstructor constructors[num_constructors];
    } else if (sync_byte == 0xFF) {
        // implicit null packet that has been removed
    }
    uint(8)   trailingbytes[trailingbyteslen];
}
// Sample format
aligned(8) class MPEG2TSSample {
    MPEG2TSPacketRepresentation packet_sample[];
}
```

FIG.7

```
// Constructor format
    aligned(8) abstract class MPEG2TSConstructor (uint(8) type) {
    uint(8)        constructor_type = type;
}
    aligned(8) class MPEG2TSImmediateConstructor
      extends MPEG2TSConstructor(1) {
      uint(8)        immediatedatalen;
      uint(8)        data[immediatedatalen];
}
    aligned(8) class MPEG2TSSampleConstructor
      extends MPEG2TSConstructor(2) {
      uint(8)        sampledatalen;
      uint(16)       trackrefindex;
      uint(32)       samplenumber;
      uint(32)       sampleoffset;
}
    aligned(8) class MPEG2TSReplicatedFFConstructor
      extends MPEF2TSConstructor(3) {
      uint(8) replicatedcount;
}
```

FIG.8

```
// Packet format
    aligned(8) class MPEG2TSPacketRepresentation {
            uint(8)   precedingbytes[precedingbyteslen];
         uint(8)  sync_byte;
         if (sync_byte == 0x47) {
            uint(8)        packet[187];
}        else if (sync_byte == 0x00) {
            uint(8)        headerdatalen;
            uint(4)        reserved;
            uint(4)        num_constructors;
              bit(1)         transport_error_indicator;
              bit(1)         payload_unit_start_indicator;
              bit(1)         transport_priority;
            bit(13)        PID;
              bit(2)         transport_scrambling_control;
              bit(2)         adaptation_field_control;
              bit(4)         continuity_counter;
              if (adaptation_field_control == '10' ||
                     adaptation_field_control == '11') {
                  uint(8)       adaptation_field[headerdatalen-3];
            }
            MPEG2TSConstructor°constructors[num_constructors];
    } else if (sync_byte == 0x01) {
              // const uint(8)[187]      MPEG2TSNullPacket; //A removed Null packet
    } else if (sync_byte == 0x02) { uint(8) entry_count;
            for ( i = 1 ; i <= entry_count ; i ++ ){
                  uint(8) offset[i];
                  uint(8) length[i];
         }
          for ( i = 1, j = 1 ; j <= 187 ; ){
                  if( i <= entry_count && j == offset[i] ){
                        //for ( k = 1 ; k <= length[i] ; k++)
                        //  const uint(8) packet[j] = 0xFF; //A removed 0xFF byte
                        j += length[i];
                        i++;
                }
                else
                        uint(8) packet[j++];
        }
}
    uint(8)    trailingbytes[trailingbyteslen];
}
```

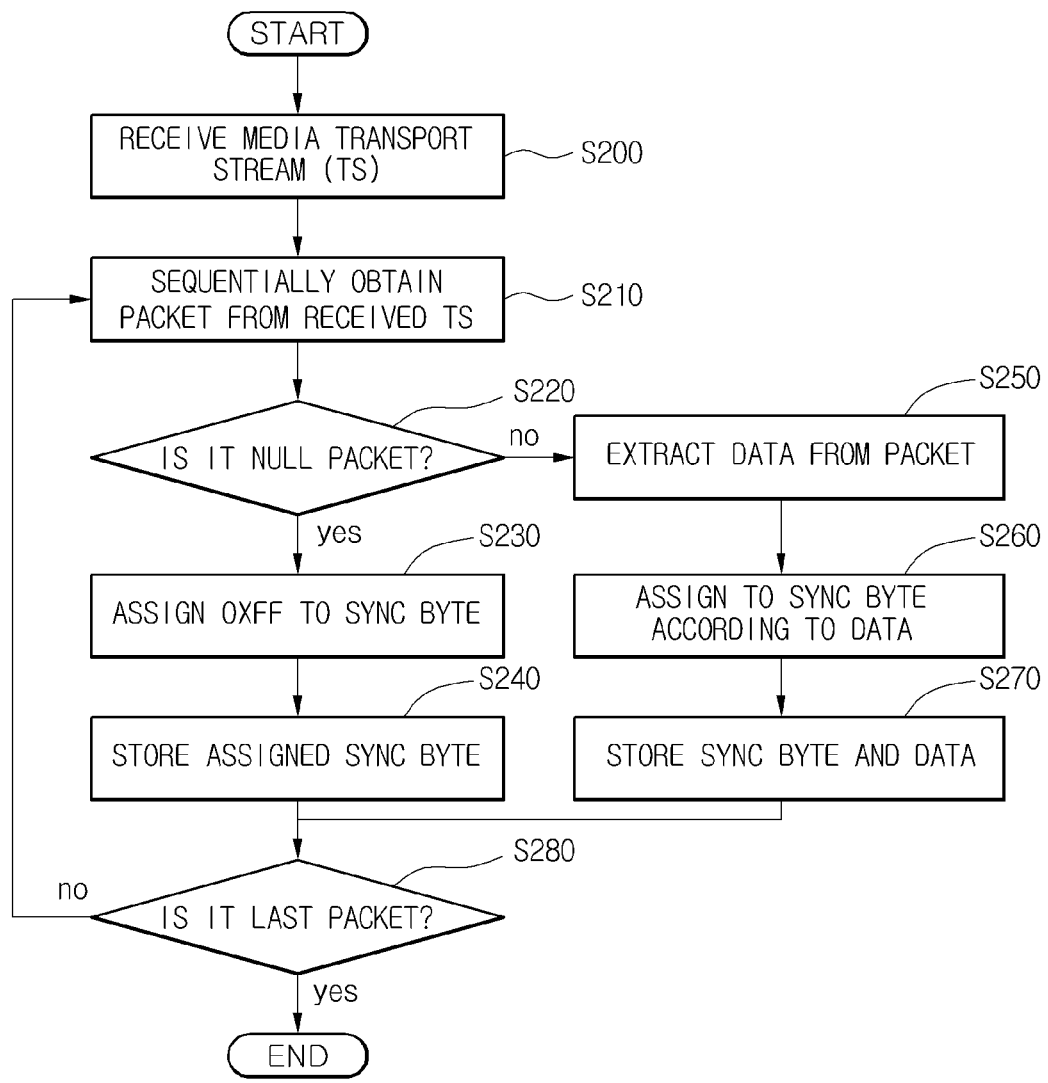

FIG.12

| No. | Type | Resolution | Fps | Bitrate | Video | Length |
|---|---|---|---|---|---|---|
| A | Film | 1280x720 | 23.976p | 8Mbit/sec | AVC | 103min |
| B | Film | 528x480 | 29.97i | 2Mbit/sec | MPEG-2 | 135min |
| C | TV | 1920x1080 | 29.97i | 6Mibit/sec | AVC | 48sec |
| D | Film | 352x240 | 23.976p | 500Kbit/sec | AVC | 103min |
| E | TV | 528x480 | 29.97i | 2Mbit/sec | MPEG-2 | 70sec |

FIG.13

| Name | Segment/ Byte-range duration (sec) | original size (Bytes) | Size after removing Null-packets (Bytes) | Compression achieved by removing null packets (%) | Size after Removing stuffing strings and sync-bytes+ overhead of signaling | overall compression (%) | Size after compression g with gzip | Compression achieved by gzip (%) |
|---|---|---|---|---|---|---|---|---|
| A | 0.5 | 2147482108 | 1996211448 | 7.04 | 1953406687 | 9.04 | 1945943889 | 9.38 |
| A | 1 | 2147479952 | 1996209380 | 7.04 | 1953404630 | 9.04 | 1945726099 | 9.39 |
| A | 2 | 2147480384 | 1996209944 | 7.04 | 1953405191 | 9.04 | 1945583968 | 9.40 |
| A | 4 | 2147481352 | 1996210884 | 7.04 | 1953406126 | 9.04 | 1945520985 | 9.40 |
| B | 0.5 | 60281824 | 57853240 | 4.03 | 56281926 | 6.64 | 56039002 | 7.04 |
| B | 1 | 60281824 | 57853240 | 4.03 | 56281926 | 6.64 | 56003084 | 7.10 |
| B | 2 | 60281824 | 57853240 | 4.03 | 56281926 | 6.64 | 55987184 | 7.12 |
| B | 4 | 60281824 | 57853240 | 4.03 | 56281926 | 6.64 | 55979455 | 7.14 |
| C | 0.5 | 36558480 | 36558480 | 0.00 | 36080313 | 1.31 | 36014859 | 1.49 |
| C | 1 | 36558480 | 36558480 | 0.00 | 36080313 | 1.31 | 36012562 | 1.49 |
| C | 2 | 36558480 | 36558480 | 0.00 | 36080313 | 1.31 | 36011619 | 1.50 |
| C | 4 | 36558480 | 36558480 | 0.00 | 36080313 | 1.31 | 36010936 | 1.50 |
| D | 0.5 | 547929572 | 547929572 | 0.00 | 450410231 | 17.80 | 443750453 | 19.01 |
| D | 1 | 547929572 | 547929572 | 0.00 | 450410231 | 17.80 | 442413411 | 19.26 |
| D | 2 | 547929572 | 547929572 | 0.00 | 450410231 | 17.80 | 441722129 | 19.38 |
| D | 4 | 547929572 | 547929572 | 0.00 | 450410231 | 17.80 | 441390269 | 19.44 |
| E | 0.5 | 185798144 | 147392564 | 20.67 | 142971141 | 23.05 | 137741999 | 25.86 |
| E | 1 | 185798144 | 147392564 | 20.67 | 142971141 | 23.05 | 137569981 | 25.96 |
| E | 2 | 185798144 | 147392564 | 20.67 | 142971141 | 23.05 | 137481908 | 26.00 |
| E | 4 | 185798144 | 147392564 | 20.67 | 142971141 | 23.05 | 137439728 | 26.03 |

METHOD FOR RECEIVING MEDIA AND DEVICE THEREOF

TECHNICAL FIELD

The present disclosure relates to a device and method for receiving media, and more particularly, to a device and method for receiving media that are used for efficiently recording and playing a received media transmission stream.

BACKGROUND ART

Currently, most digital broadcasts such as a cable, satellite or digital multimedia broadcasting (DMB) broadcast are streaming audio/visual (AV) content by using an MPEG 2 transport stream (TS).

Also, digital broadcasts have developed to demand more capacity such as stereo 3D video broadcasts, ultra high definition (UHD) broadcasts, multi-view 3D video broadcasts, and hologram broadcasts.

On the other hand, digital broadcast receivers receive a large-sized media TS according to such a trend and provide a service to enable a user to play or store the TS.

However, since the large-sized media transport stream is optimized for transmission, it may be inefficient in playing and recording.

DISCLOSURE OF THE INVENTION

Technical Problem

Embodiments also provide methods and devices capable of maintaining play compatibility and performance and decreasing a waste of a storage space in recording a media TS such an MPEG-2 TS.

Technical Solution

In one embodiment, a method of receiving media includes selecting a receiving channel;

receiving a media transport stream (TS) transported through the receiving channel; generating a media storage stream based on the received media TS; and recording the media storage stream, wherein the media storage stream comprises at least one sync byte that represents removed data among the media TS.

In another embodiment, a device for receiving media includes a receiving unit selecting a channel and receiving a media transport stream (TS) transported through the selected channel; a control unit generating a media storage stream based on the received media TS; and a storage unit recording the media storage stream, wherein the media storage stream comprises at least one sync byte that represents removed data among the media TS.

Advantageous Effects

According to an embodiment, since in receiving a media transport stream (TS) such as an MPEG-2 TS, some data unnecessary for playing or recording among the received stream is removed and a sync byte representing it is stored as a part of a media storage stream, it is possible to secure play compatibility and decrease a volume of a media file to be stored.

Also, according to an embodiment, since information on removed some data may be explicitly or implicitly included in a media storage stream, restorable removal is possible.

On the other hand, according to an embodiment, since unnecessary some data may be removed when file indexing for storing a media TS, it is possible to enhance storage space utilization while maintaining a recording speed.

BRIEF DESCRIPTION OF THE DRAWINGS

FIG. 3 is a flow chart of a method of receiving media according to an embodiment;

FIG. 5 represents a mechanism in which stuffing data and null packets are removed from a media TS, according to an embodiment;

FIG. 6 represents packet format syntax for a media storage stream and sample format syntax using the packet format syntax if a null packet is removed according to an embodiment, and FIG. 7 represents various types of constructor format syntax capable of being included in MPEG2TSConstructor in syntax of FIG. 6;

FIG. 8 represents a packet format for a media storage stream if null packets and stuffing bytes are removed according to another embodiment;

FIG. 9 is a flow chart of a method of removing null packets from a media TS according to an embodiment;

FIG. 12 and FIG. 13 show experiment data for explaining, through comparison, a storage space securing effect according to an embodiment;

MODE FOR CARRYING OUT THE INVENTION

Figure 1:
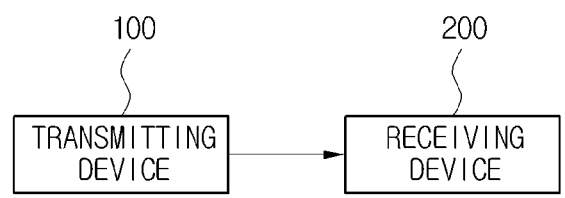
FIG. 1 is a block diagram of a media transmission and reception system according to an embodiment.

The followings only illustrate the principle of the present invention. Therefore, although being not clearly described or shown in the specification, a person skill in the art may invent various devices that implement the principle of the present invention and are included in the concept and scope of the present invention. Also, all conditional terms and embodiments enumerated in the specification are, in principle, intended only for the purpose of understanding the concept of the present invention and thus it should be understood that the present invention is not limited to embodiments and state to be particularly enumerated.

Also, it should be understood that all detailed descriptions enumerating specific embodiments as well as the principle, view and embodiments of the present invention are intended to include their structural and functional equivalents. Also, such equivalents should be understood as including currently known equivalents as well as equivalents to be developed in future, namely, all elements invented to perform the same function irrespective of their structures.

Thus, for example, block diagrams used herein should be understood as representing the concept of an exemplary circuit that embodies the principle of the present invention.

Likewise, all flow charts, state transition diagrams, and pseudo codes should be understood as representing various processes that may be substantially represented on computer readable mediums and are performed by computers or processors irrespective of whether the computers or the processors are clearly shown.

The functions of various elements shown in drawings including a processor or a functional block represented as concept similar to the processor may be provided by using dedicated hardware and hardware having an ability to execute software in terms of appropriate software. When being provided by a processor, such functions may be provided by a single dedicated processor, a single shared processor, or a plurality of individual processors of which some may be shared.

Also, the clear usage of a processor, control or a term presented as concept similar to those should not be interpreted as exclusive citation of hardware having an ability to execute software, but be understood as implicitly including a digital signal processor (DSP) hardware, a ROM for storing software, a RAM, and a non-volatile memory without limitation. Other known and common hardware may also be included.

In the following claims, components expressed as means for performing functions described in the detailed description are intended as including, for example, combinations of circuit elements performing the functions or all methods performing functions including all types of software including firmware/micro codes, and are combined with appropriate circuits for executing the software to perform the functions. Since the present invention defined by such claims follows a rule needed by claims and functions provided by various enumerated means are combined, it should be understood that any means capable of providing the functions are equivalent to matters grasped from the specification.

The above objects, characteristics, and advantages will be clear through the following detailed description related to the accompanying drawings and thus a person skill in the art will be able to easily practice the technological spirit of the present invention. When describing the present disclosure, detailed descriptions related to well-known functions or configurations will be ruled out in order not to unnecessarily obscure subject matters of the present disclosure.

Exemplary embodiments are described below in more detail with reference to the accompanying drawings.

FIG. 1 is a block diagram of a media transmission and reception system according to an embodiment and the shown transmission and reception system may include a transmitting device 100 and a receiving device 200.

Referring to FIG. 1, the transmitting device 100 and the receiving device 200 may transmit and receive data by using a broadcast-based or internet protocol (IP)-based transport system.

The transmitting device 100 may receive and convert content from a content provider to transport or store and keep the converted content in a media DB.

For example, a media transport stream (TS) provided from the content provider follows MPEG-2 standard and may thus be an MPEG-2 TS widely employed in various application fields, and the transmitting device 100 may convert the MPEG-2 TS into a media file format defined by international organization for standardization (ISO) and then transport the converted TS through a network such as a broadcast network or an internet network or store it in the media DB.

On the other hand, the receiving device 200 may receive the media TS from the transmitting device 100, covert the received media TS and then play the converted media TS or store it in a local storage. The receiving device 200 may be, for example, a network TV, a smart TV, an IPTV, a set-top box, etc. and may be implemented in a smart phone, a laptop, etc. as needed.

For example, after converting the media TS received from the transmitting device 100 into an MPEG-2 TS format, the receiving device 200 may process the converted media TS and then play or store it in a local storage. In particular, the receiving device 200 may index the MPEG-2 TS encapsulated in the media file format and perform a storage operation.

The MPEG-2 TS is aimed at lossy transport systems such as digital video broadcasting environments including digital video broadcasting (DVB) or advanced television system committee (ATSC). Media based on the MPEG-2 TS is widely used, and thus related encoding and decoding engines are being usefully used in digital video broadcast environments.

However, there is redundancy unnecessary for play and storage in an MPEG-2 TS based media file format that is currently used. For example, in order to broadcast an MPEG-2 TS stream coded at a constant bit rate (CBR), a fixed bit rate, a media stream includes data for maintaining a bit rate in a codec layer or an encapsulation layer. However, the data is not used for playing or storing an image. Nevertheless, the current MPEG-2 TS system may not restorably remove such unnecessary redundancy.

Thus, according to an embodiment, since the receiving device 200 stores or plays the received media TS and removes redundancy from the MPEG-2 TS based media, it is possible to decrease a waste of a storage space and enhance efficiency.

To this end, the receiving device 200 may perform compression or conversion for removing the redundancy with respect to the MPEG-2 TS based media and store processed media as a media storage stream format in a local storage.

In addition, the receiving device 200 may record the compressed or converted media storage stream in the local storage. The receiving device 200 may perform the compression or conversion together with file indexing and record the stream in the local storage.

In addition, the receiving device 200 may play the recorded media storage stream in response to a user request. In addition, the receiving device 200 may also restore removed data as needed, generate an original transport stream and transmit the restored stream to the outside through a network.

Figure 2:
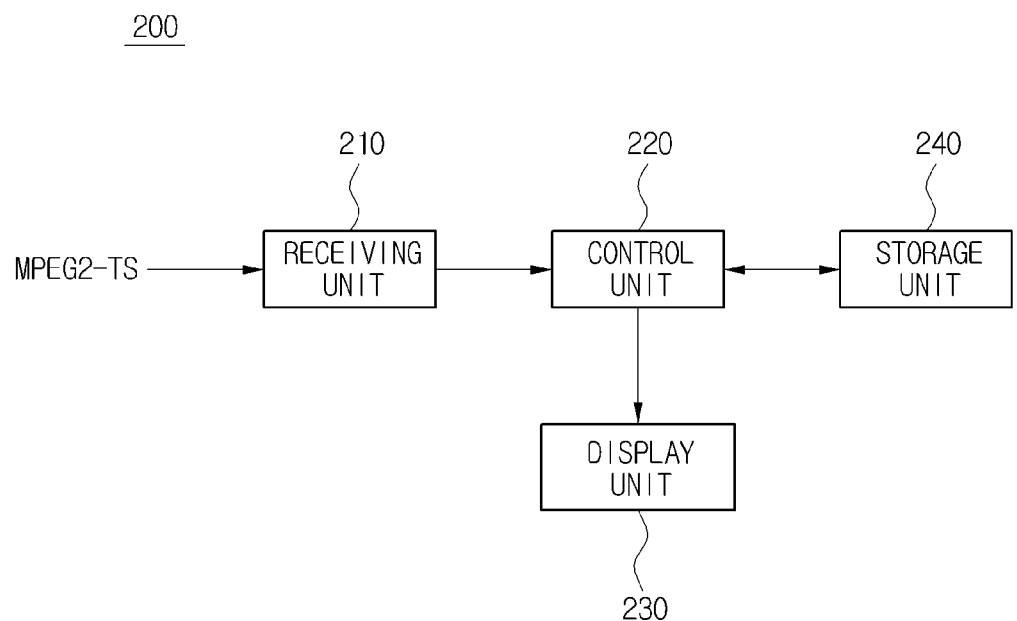
FIG. 2 is a block diagram of a receiving device according to an embodiment.

FIG. 2 is a block diagram of a receiving device according to an embodiment, and a receiving device 200 includes a receiving unit 210, a control unit 220, a display unit 230, and a storage unit 240.

Referring to FIG. 2, the receiving unit 210 receives an MPEG-2 TS type media TS.

In addition, the control unit 220 may remove some data from an input MPEG-2 TS type media TS, convert a processed stream into a storage stream and store it in the storage unit 240. The storage stream may include at least one sync byte representing that some data has been removed.

In this example, the MPEG-2 TS is defined for lossy systems, has a fixed packet size of 188 bytes in order to satisfy requirements for an asynchronous transfer mode (ATM) network, and a timing and a buffering model are focused on a fixed bit-rate channel.

However, a stream transported according to a network requirement may include data unnecessary for storing and playing a stream already transported. Thus, a method of receiving a media TS according to an embodiment may previously remove data unnecessary for storing and playing a TS already received and store a processed stream in a media file format compatible with an MPEG-2 TS system.

For example, the unnecessary data removed from the MPEG-2 TS is syntax-based redundancy and may be a specific syntax element included in the header of the MPEG-2 TS, a stuffing byte or a null packet.

On the other hand, the receiving device 200 may insert information on the data removed from the MPEG-2 TS as described above, into a media stream of a storage format by using a sync byte. The storage format may be compatible with the MPEG-2 TS format.

For example, the control unit 220 of the receiving device 200 removes a specific null packet from the MPEG-2 TS and inserts a sync byte representing the existence of a null packet into a part where the null packet is removed so that it is possible to decrease a volume of streams to be stored.

Embodiments of a method of receiving media according to the present invention are described below in more detail with reference to FIG. 3 to FIG. 11.

FIG. 3 is a flow chart of a method of receiving media according to an embodiment and the receiving method is described in conjunction with a block diagram of the receiving device according to an embodiment as shown in FIG. 2.

Referring to FIG. 3, the receiving unit 210 of the receiving device 200 receives a media TS in step S110. The receiving unit 210 may receive an MPEG-2 TS type media TS from a broadcast network or an internet network through HTTP. To this end, the receiving unit 210 may include a tuner, a demodulation unit or a network interface. The received media TS may be delivered to the control unit 220.

In addition, the control unit 220 removes some data from the received media TS in step S120.

For example, the control unit 220 may remove redundancy data unnecessary for playing or storing from an input MPEG-2 TS.

Figures 4A, 4B:
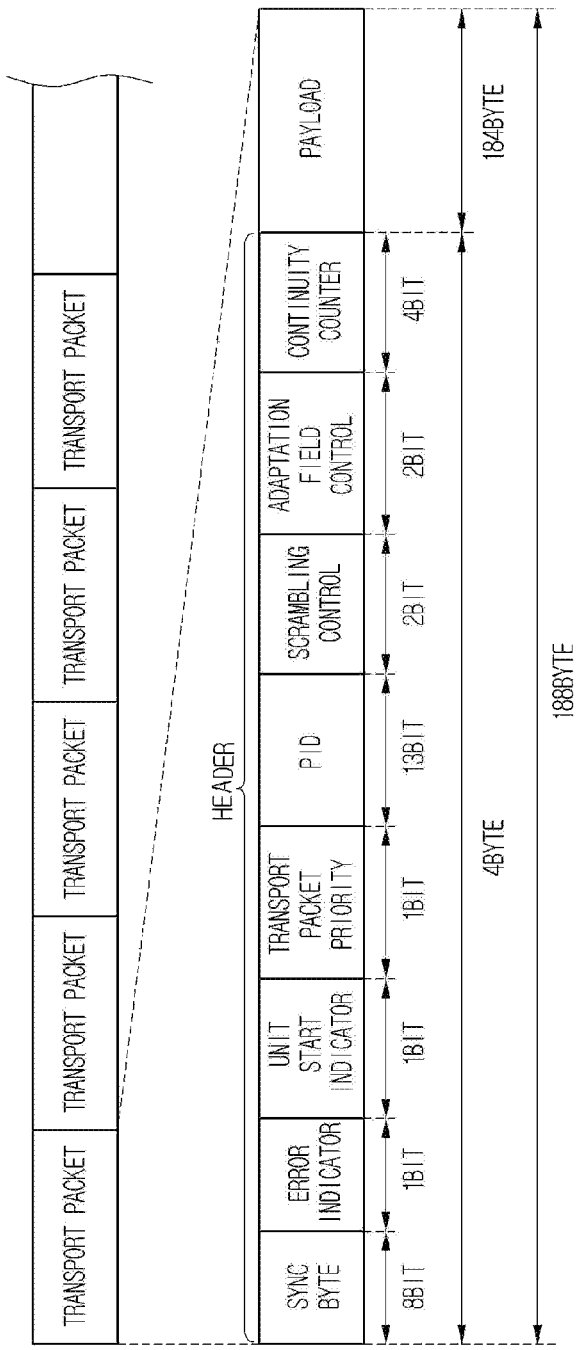
FIG. 4 is a diagram for explaining a configuration of an MPEG-2 transport stream (TS)

Referring to a configuration of an MPEG-2 TS as shown in FIG. 4, a transport packet includes a 4-byte header and a 184-byte payload following the header and has a size of 188 bytes irrespective of an intended transport mechanism.

On the other hand, the header may include a 8-bit sync byte, a 1-bit transport error indicator, a 1-bit payload unit start indicator, a 1-bit transport packet priority, a 13-bit packet identification (PID), 2-bit transport scrambling control, 2-bit adaptation field control (AFC) and a four-bit continuity counter.

By using a packetization mechanism of the MPEG-2 TS having a fixed size of 188 bytes per packet as described above, byte stuffing may be used.

For example, when a program specific information (PSI) TS packet is partially filled or a program elementary stream (PES) packet partially fills the TS packet, unnecessary stuffing bytes as described above may be included in the MPEG-2 TS.

That is, in order to satisfy a fixed bit rate of 188 bytes per packet, stuffing bytes having a value of 0×FF may be repetitively inserted into the payload of the MPEG-2 TS and thus it is possible to cause a volume of data unnecessary for storing and playing.

Also, in order to achieve a fixed bandwidth or a desired multiplexing ratio, unnecessary null packets may be inserted into the MPEG-2 TS. In this case, a decoder removes null packets as described above and then performs decoding.

For example, when the PID included in the header is 0×1FFF, it may represent that a corresponding packet is a null packet, and the payload of the null packet may be entirely filled with zero or 0×FF bytes.

According to an embodiment, the control unit 220 of the receiving device 200 may remove unnecessary data as described above, for example, stuffing bytes or null packets from the received MPEG-2 TS to be able to secure a storage space.

However, the stuffing bytes or null packets of the MPEG-2 TS are only examples of an embodiment and the present invention is not limited thereto. The receiving device 200 may remove, from the MPEG-2 TS, data unnecessary for storing and playing in addition to the above-described data.

Then, the control unit 220 generates a media storage stream based on a data-removed media TS in step S130. The media storage stream may be recorded in the storage unit 240 and have an MPEG-2 TS compatible format that may be played by the receiving device 200 or other devices as needed.

For example, the control unit 220 may re-configure the MPEG-2 TS that unnecessary data has been removed in step S120, as a media storage stream according to an ISO/IEC 14496-12 ISO base media file format. Since the volume of the re-configured media storage stream is less but maintains compatibility with a typical MPEG-2 TS format, a general MPEG-2 TS decoder may play the re-configured media storage stream without difficulty.

In this example, the control unit 220 assigns a sync byte representing the removed data and inserts the sync byte into the media storage stream in step S140.

For example, the control unit 220 may assign information signaling the data removed in step S120 as a specific value of the sync byte and include the sync byte in the media storage stream. Since the sync byte is an essential component of the MPEG-2 TS, it is possible to signal data removal without additional data, through signaling using the sync byte.

In addition, the control unit 220 may play a sound or an image with reference to the sync byte of the media storage stream. When playing, the data removed from the media TS may be ignored according to a value assigned to the sync byte.

On the other hand, the control unit 220 may also restore the removed data based on the sync byte.

For example, when the removed data includes the above-described null packet, the control unit 220 may restore the removed null packet based on the sync byte and thus restore the media storage stream to an originally received TS.

Also, according to another embodiment, when the removed data includes the above-described stuffing byte, the control unit 220 may place information for restoring to an original TS, behind the sync byte. Thus, control unit 220 may restore the null packet and the stuffing byte based on the sync byte and restoration information and thus restore an original TS.

Then, the control unit 220 records the media storage stream including the sync byte in the storage unit 240 in step S150.

For example, the control unit 220 may receive an MPEG-2 TS type media TS corresponding to a program that a user has reserved to record, generate a media storage stream based on the received media TS and store the generated storage stream in the storage unit 240. In addition, it is possible to play the media storage stream recorded in the storage unit 240 in response to a user's request for playing the program that the user has planed to record.

Also, the control unit 220 may also transport the media storage stream recorded in the storage unit 240 to an external device through a network interface. When the external device supports the playing of the MPEG-2 TS, it may play, without difficulty, a media storage stream that unnecessary data has been removed, and thus the media storage stream recorded by the control unit 220 may have high compatibility with other devices following MPEG standard.

In this example, the storage unit 240 may also store a program for processing and controlling each signal in the control unit 240 or store a signal-processed image, sound or data signal. Also, the storage unit 240 may also perform a function for temporarily storing an image, sound or data signal input from the receiving unit 210. Also, the storage unit 240 may store information on a certain broadcast channel through a channel memory function.

To this end, the storage unit 240 may include at least one type storage medium of, for example, a flash memory type memory, a hard disk type memory, a multimedia card micro type memory, and a card type memory (for example, an SD or XD memory, etc.), an RAM, and an EEPROM.

FIG. 5 represents a mechanism in which stuffing data and null packets are removed from a media TS, according to an embodiment.

(a) of FIG. 5 represents a media TS (MPEG-2 TS) received from the receiving unit 210. Each of packets may include a 1-byte sync byte and 187-byte data bytes.

(b) of FIG. 5 represents a media storage stream generated from a media TS. As shown in (b) of FIG. 5, the control unit 220 may generate a new format of a media storage stream that stuffing bytes ad a null packet are removed from the media TS.

Firstly, in the case of a first packet, bytes A, B and C may be stuffing bytes assigned as 0×FF, and other bytes L, M and N may be data bytes including actual data.

The control unit 220 may firstly parse the first packet, remove the stuffing bytes A, B, and C from the media TS, and generate the media storage stream of which data parts include only bytes L, M and N.

In this case, the control unit 220 may assign a specific value to the sync byte of the packet that stuffing bytes are removed, in the media storage stream. For example, 0×02 may be assigned to the sync byte of the packet after the stuffing bytes are removed, as shown in (b) of FIG. 5.

Also, the control unit 220 may configure restoration information for restoring the removed stuffing bytes. For example, the restoration information may include entry_count and offset$_{13}$ length$_{13}$ table.

The control unit 220 may place the restoration information behind the sync byte and the restoration information may be used for restoring an original media TS.

The entry_count of the restoration information may represent the count of data byte sections divided by stuffing bytes.

The offset$_{13}$ length$_{13}$ table of the restoration information may include a table sequentially representing the length of each of data byte sections.

On the other hand, in (a) of FIG. 5, the control unit 220 may identify that a second packet of the media TS is a null packet, remove the null packet, and insert the null packet into the media storage stream as shown in (b) of FIG. 5.

In addition, the control unit 220 may assign a specific value to the sync byte of the packet that the null packet is removed, in the media storage stream.

For example, the sync byte of the packet that the null packet is removed may be assigned 0×01 as shown in (b) of FIG. 5 but may be assigned other values. For example, the sync byte of the packet that the null packet is removed may also be assigned 0×FF.

In particular, when the sync byte of the packet that the null packet is removed is assigned 0×FF, other devices supporting typical standard may ignore that packet and thus there is an effect of increasing play compatibility.

On the other hand, since the control unit 220 is a data packet in the case of a third packet, it is possible to insert the packet into the media storage stream while maintaining the sync byte as 0×47.

FIG. 6 represents packet format syntax for a media storage stream and sample format syntax using the packet format syntax if a null packet is removed according to an embodiment.

FIG. 7 represents various types of constructor format syntax capable of being included in MPEG2TSConstructor in syntax of FIG. 6.

As shown in FIG. 6, a media storage stream recorded by the control unit 220 may have a packet format according to a sync byte. Each packet may include a preceding byte, a sync bye, a trailing byte, and packet data according to a sync byte.

The preceding byte represents additional data that the receiving device 200 may add before packet data. For example, additional data may include a timestamp.

The sync byte represents a format of TS packet data following the sync byte.

When the sync byte is 0×47, 187-byte data following the sync byte may include other data excluding the sync byte from the MPEG-2 TS packet of a received media TS, in a packet field as it is. When packet data is actually input to a streaming channel, this value needs to be set to 0×47 in any cases.

Also, when the sync byte is 0×00 or 0×01, data following the sync byte may include a header data length, the number of constructors, a transport error indicator, a payload, a unit start indicator, a transport priority, a packet identification, transport scrambling control, adaptation field control, and at least one MPEG-2 TS constructor. When an MPEG-2 TS sample constructor is used, it may point a track indexed by a trackrefindex field in a track reference box of which a reference type is hint.

FIG. 7 illustrates various formats of an MPEG-2 TS constructor. The MPEG-2 TS constructor may include an MPEG2TSConstructor having a construction type field, an MPEG2TSImmediateConstructor) formed by expanding it, an MPEG2TSSampleConstructor, and MPEG2TSReplicatedFFConstructor. Each constructor may include a plurality of fields according to a use.

In this example, the MPEG2TSConstructor, the MPEG2TSImmediate Constructor, and the MPEG2TSSampleConstructor may follow the rule defined in ISO 14496-12.

On the other hand, the MPEG2TSReplicatedFFConstructor may include a replicatedcount field representing how many times a specific value, for example, a 0xFF byte has been repeated. Thus, the receiving device 200 may simply represent by using the MPEG2TSReplicatedFFConstructor when the 0xFF byte is repeated several times in the received media TS. Then, if there is an MPEG2TSReplicatedFFConstructor when playing, the receiving device 200 may repetitively generate 0xFF data and include the data in a packet.

For example, the receiving device 200 may remove repeated 0xFF bytes from a TS packet and not a null packet, and represent it by using the MPEG2TSReplicatedFFConstructor. When the MPEG2TSReplicatedFFConstructor is used for a media storage stream format, there is an effect in that a volume of a media storage stream that a null packet is removed decreases.

Also, for increasing storage efficiency, the MPEG2TSReplicatedFFConstructor may also be used only when the number of repeated bytes is equal to or greater than a certain value. For example, only when 0xFF is repeated more than the size of the replicatedcount field, the MPEG2TSReplicatedFFConstructor may also be included in media storage stream data. Thus, it may be removed as needed when unnecessary data is repeated in a receiver's storage device or a server's storage device.

In FIG. 6, when the sync byte is 0x00 or 0x01, packet data following the sync byte may include the MPEG2 TS constructors in a num_constructors sized array form. It is possible to configure one or a plurality of stream packets by single MPEG2 TS constructor or a combination of MPEG2 TS constructors.

For example, the MPEG2TSImmediateConstructor may include a PES header. Also, the MPEG2TSSampleConstructor may reference data in an associated media track. In addition, when the MPEG2 TS Replicated FF constructor is not used, a sum of a value of a headerdatalen field and a value of a datalen field for all constructors of one MPEG2 TS packet may be 187 that is equal to a value subtracting 1 byte from the length of a stream packet.

On the other hand, when the sync byte is 0xFF, it represents that a corresponding null packet has been removed. Thus, there may be no 187-byte packet data following the sync byte 0xFF. By using such a method, the control unit 220 may implicitly represent through data removal that a null packet in a media storage stream is removed. Also, it is possible to explicitly represent by assigning a value of 0xFF to the sync byte.

In addition, the trailing byte represents additional data that the receiving device 200 may add behind packet data. For example, additional data may include checksum that represents whether there is an error.

FIG. 8 represents a packet format for a media storage stream if null packets and stuffing bytes are removed according to another embodiment.

Referring to FIG. 8, descriptions of when the sync byte of a media storage stream packet is 0x47 or 0x00 and its repeated form are not provided because they are the same as those provided with respect to FIG. 6.

When the sync byte is 0x01, it may represent that a null packet has been removed, similarly to when the sync byte is 0xFF in FIG. 6. The size of the removed null packet may be 187 bytes.

On the other hand, when the sync byte is 0x02, it may represent that a stuffing byte has been removed.

In this example, the packet that the stuffing byte has been removed may include restoration information that may reconfigure the stuffing byte.

The restoration information may include count information on data sections entry_count divided by the removed stuffing byte, offset information on each data section and length information on each section.

Thus, the control unit 220 may restore an original media TS from the media storage stream that the stuffing byte has been removed.

For example, the control unit 220 may arrange data sections having a length size every offset in a packet and fill the other parts with a stuffing byte of 0xFF to be able to restore an original media TS packet.

FIG. 9 is a flow chart of a method of removing a null packet from a media TS according to an embodiment.

Referring to FIG. 9, the receiving unit 210 firstly receives a media TS in step S200. In response to a user request, the receiving unit 210 may receive a media TS such as an MPEG-2 TS transported through a broadcast channel or an internet network as described above. The receiving unit 210 may deliver the received media TS to the control unit 220.

In addition, the control unit 220 sequentially obtains packets from the received media TS in step S210.

The control unit 220 may select a media TS of a program that a user has planned or requested storage, among the received media TS, and obtain packets included in the media TS to store the media TS.

In addition, the control unit 220 determines whether the obtained packet is a null packet in step S220. The null packet may typically include a fixed data pattern, for example, zeroes. Thus, the control unit 220 may determine whether the obtained packet is a null packet, based on whether there is such a fixed data pattern in the packet.

Also, the control unit 220 may separately include a null packet detection unit for identifying a null packet. The null packet detection unit may detect a preamble of media TS packet data received from the receiving unit 210, determine whether following data bits has a fixed data pattern, for example, zeroes, and thus deliver to the control unit 220 that a null packet has been obtained.

If it is identified as a null packet, the control unit 220 assigns a specific value, for example, 0xFF to a sync byte corresponding to the null packet in step S230 and stores the assigned sync byte in the storage unit 240 in step S240.

The control unit 220 may remove packet data corresponding to the null packet from the media TS received from the receiving unit 210 and record it in a media storage stream format in the storage unit 240. In this case, the control unit 220 may include and record the sync byte assigned as 0xFF in the media storage stream to correspond to the null packet.

On the other hand, if it is identified that the packet is not a null packet, the control unit 220 extracts packet data from the packet in step S250, and assigns a sync byte according to data's content in step S260.

If it is identified that the packet is not a null packet but normal packet data, the control unit 220 may designate a sync byte corresponding to data on the packet in order to store the packet in a media storage stream format.

The sync byte may be determined according to the content of packet data. For example, when the above-described MPEG2-TS constructor is needed to store or play packet data, or when packet data includes header information, the control unit 220 may designate the sync byte to 0x00. In addition, when packet data entirely includes only image or sound data of MPEG-2 TS, the control unit 220 may designate the sync byte to 0x47.

In addition, the control unit 220 determines whether the currently obtained packet is the last packet of the received media TS in step S280.

If the currently obtained packet is the last packet, the control unit 220 may complete recording a media storage stream, perform needed processing and then end a task. The control unit 220 may then play a stored media storage stream in response to a user request or transport the stream to other devices or other storage mediums.

In addition, if the currently obtained packet is not the last packet t, step S210 is re-performed to sequentially obtain the next packet of the received media TS again.

Through such processes, the receiving device 200 may store the received media TS in a format compatible with a typical MPEG-2 TS decoding system and save a storage space.

For example, the receiving device 200 or other MPEG-2 TS playable devices may simply play a recorded media storage stream by using the above method.

In the case of the receiving device 200, the control unit 220 may receive a command to play and select a media storage stream, and sequentially obtain media storage stream data selected from the storage unit 240, according to a sync byte.

In this example, the control unit 220 may firstly obtain a sync byte, ignore a related packet according to MPEG-2 TS standard when the sync byte is 0×FF, and process a packet corresponding to the next sync byte. When the sync byte is not 0×FF, the control unit 220 may play corresponding packet data before the next sync byte.

Thus, the method of receiving a media TS according to the present invention may maintain the MPEG-2 TS format of the received media TS without additional information and record the received media TS in the format of a media storage stream that an unnecessary null packet has been removed.

On the other hand, information on such a media storage stream may be separately stored in a hint tract in a media storage stream for following transport but the present invention is not limited thereto.

On the other hand, according to an embodiment, an unnecessary null packet or stuffing packets may be restorably removed.

Figure 10:
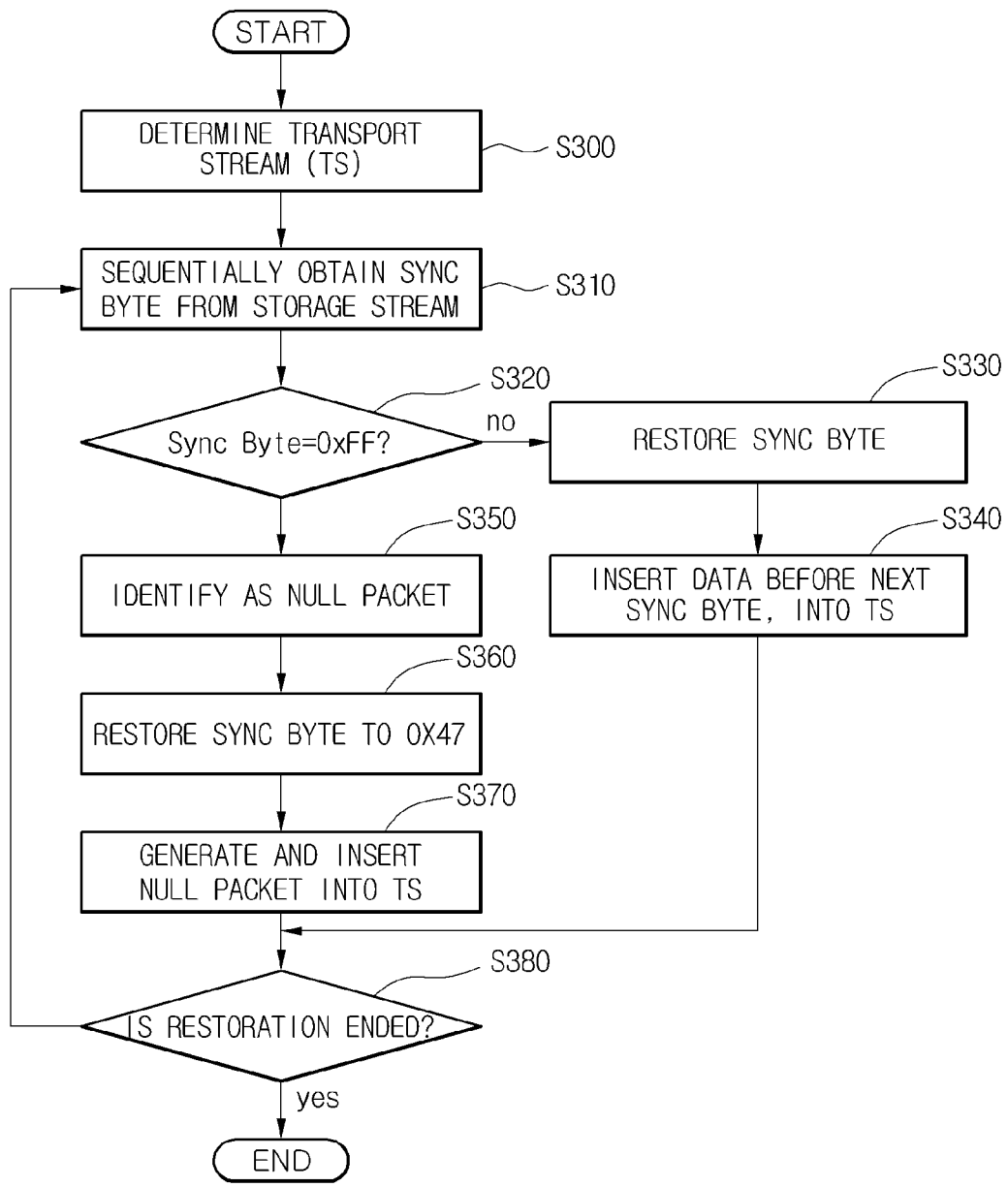
FIG. 10 is a flow chart of a method of restoring an original media TS from a media storage stream that null packets are removed according to an embodiment.

FIG. 10 is a flow chart of a method of restoring an original media TS from a media store stream that null packets are removed according to another embodiment.

Referring to FIG. 10, the control unit 220 firstly determines to restore a TS in step S300.

The control unit 220 may determine to restore a media TS originally received according to a user input. The control unit 220 may load a media storage stream from the storage unit 240 in order to restore a media TS.

In addition, the control unit 220 sequentially obtains a sync byte from a media storage stream in step S310 and determines whether a value of the sync byte is 0×FF in step S320.

When the value of the sync byte is not 0×FF, a related packet is not a null packet and thus the control unit 220 restores the sync byte according to packet data in step S330. The sync byte may be designated as, for example, 0×47 representing a TS packet.

In addition, the control unit 220 inserts packet data before the next sync byte, into a TS to be restored in step S340.

On the other hand, when the sync byte is verified as 0×FF, the control unit 220 determines as a null packet in step S350 and restores the sync byte in step S370. Since the null packet is also a TS packet for maintaining a bandwidth, the sync byte may be designated as 0×47.

In addition, the control unit 220 generates a null packet according to a restored sync byte and inserts the generated null packet into a TS in step S370.

Then, the control unit 220 determines whether restoration is ended in step S380. If the restoration is ended, the control unit 220 may the restored TS into the outside. If the restoration is not ended, step S310 may be re-performed.

As such, the receiving device 200 uses a sync byte for restoring a media TS from a media storage stream that a null packet has been removed.

Figure 11:
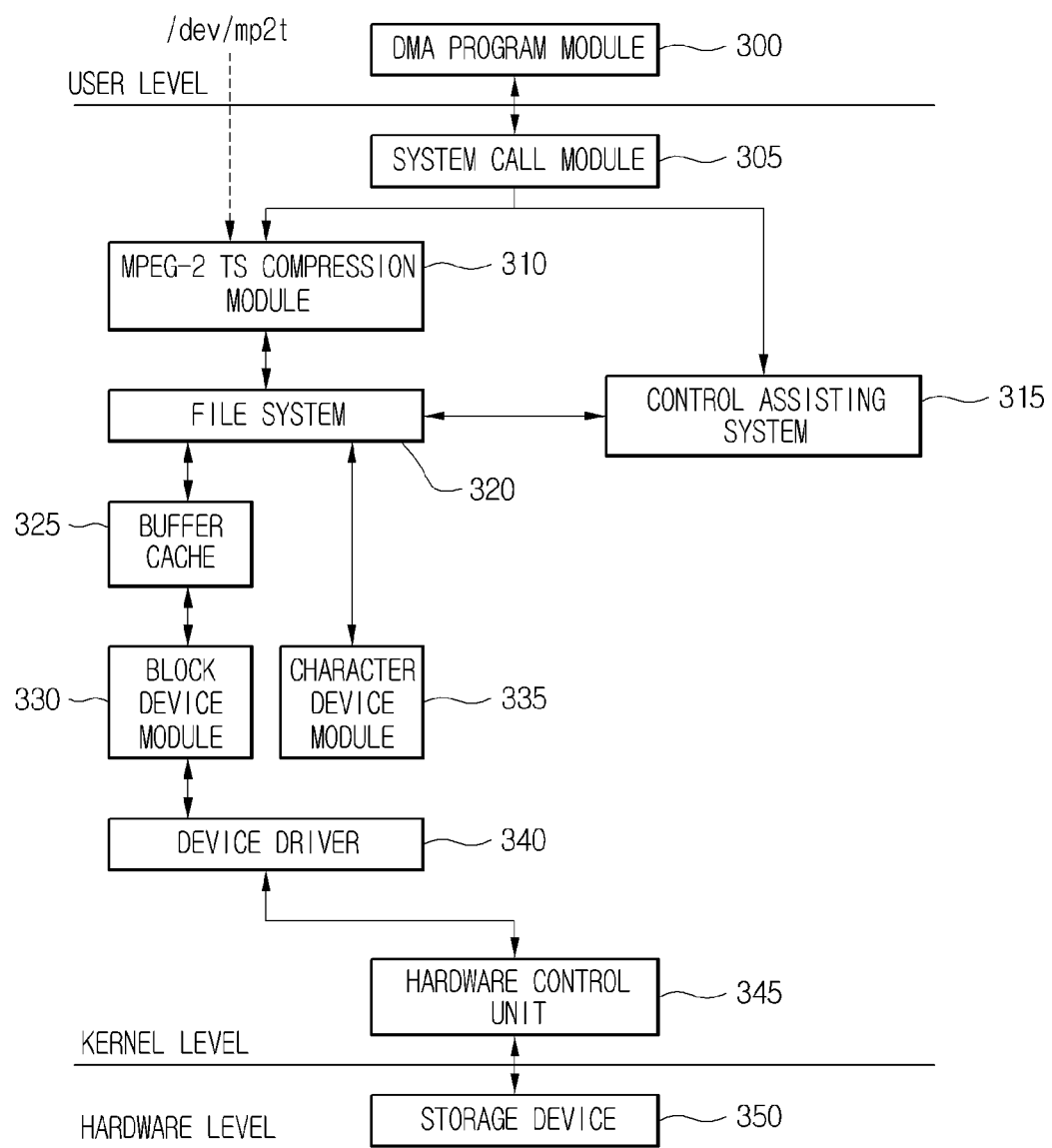
FIG. 11 is a block diagram of a file system structure of a receiving device capable of recording a media storage stream according to an embodiment.

FIG. 11 is a block diagram of a file system structure of a receiving device capable of recording a media store stream according to an embodiment.

Referring to FIG. 11, a file system may be divided into a user level, a kernel level and a hardware level.

A user-level DMA program module 300 delivers, to the kernel level, a file system request made from an application in a user area and receives a related response.

In addition, each of blocks configuring the kernel level is the core of an operating system (OS) and may perform at least one of executing a hardware driver, maintaining the security of hardware and a processor in an image display device, the efficient management of a system resource, memory management, providing an interface for hardware by hardware abstraction, multiple processes and schedule management according to the multiple processes.

Such kernel-level blocks may be implemented based on various OSs such as Unix (Linux) or Windows. Also, as an open OS kernel, they may be implemented as a universal kernel that may be used on other electronic devices.

The method of receiving a media TS according to an embodiment may be performed on a kernel-level MPEG-2 TS compression module 310.

The MPEG-2 compression module 310 may receive an MPEG-2 TS type media TS in response to a request input through a system call module 305 from a user level, remove a null packet or a stuffing byte according to an embodiment, and then deliver the stream to the file system 320.

Also, the MPEG-2 TS compression module 310 may use a DMA channel to deliver each MPEG-2 TS packet or data in which continuous packets are combined, to a user-level MPEG-2 TS system decoder.

On the other hand, a kernel may selectively provide an interface called/DEV/MP2T to be able to approach a file system through the MPEG-2 TS compression module 310 directly without the aid of a DMA channel, for example.

The file system 320 indexes a media storage stream file that unnecessary data is removed and compressed from the MPEG-2 TS compression module 310, and stores the indexed file in a hardware storage device 350 through a device driver 340. To this end, the file system 320 may be process-controlled by a control assisting system 315.

In addition, the file system 320 is connected to a character module 335 and a block module 330 for data processing. Since data is transported on a specific block basis, the block module 330 may need a buffer cache 325 to keep a corresponding block. In addition, the character module 335 may not need a buffer because it transports data in units of kernel's fundamental data, namely, in units of character.

In addition, the device driver 340 controls a device connected through the hardware control unit 345. The device driver 340 may store data indexed by the file system 320 in the storage device 350 through the hardware control unit 345.

Through such a user-level, kernel-level, and hardware-level system configuration, a null packet is removed by the MPEG-2 TS compression module 310 together with file indexing, and the file is compressed and stored in the storage device 350. Thus, according to an embodiment, it is possible to secure a storage space only by removing a null packet without a time delay due to compression. Thus, it is possible to efficiently utilize a storage space.

FIG. 12 and FIG. 13 show experiment data for explaining, through comparison, a storage space securing effect according to an embodiment.

FIG. 12 represents a media TS to be experimented, and FIG. 13 represents a data size and compression according to each experiment result.

Each column of FIG. 13 represents segment (byte-range duration, sec), original size (bytes), size after removing null packets (bytes), compression achieved by removing null packets (%), size after removing stuffing strings and sync-bytes+overhead of signaling, size after compression g with gzip, and compression achieved by gzip (%).

As seen in FIG. 13, the size of a media storage stream after removing a null packet or a stuffing byte may lead to a significant decrease in volume to be stored than its original size. Also, it may be seen that compression by a decrease in volume to be stored does not show a great difference as compared to gzip, a compression application. In particular, since a media storage stream format according to an embodiment has compatibility that may play as-is without uncompression like gzip, it is possible to decrease a volume to be stored and it is possible for typical players to play a stream without a delay.

The methods of receiving and processing media as described with reference to FIG. 1 to FIG. 13 may be performed by an IPTV receiver according to an embodiment.

A configuration of an IPTV receiver according to an embodiment will be described in more detail below with reference to FIG. 14 and FIG. 15.

Figure 14:
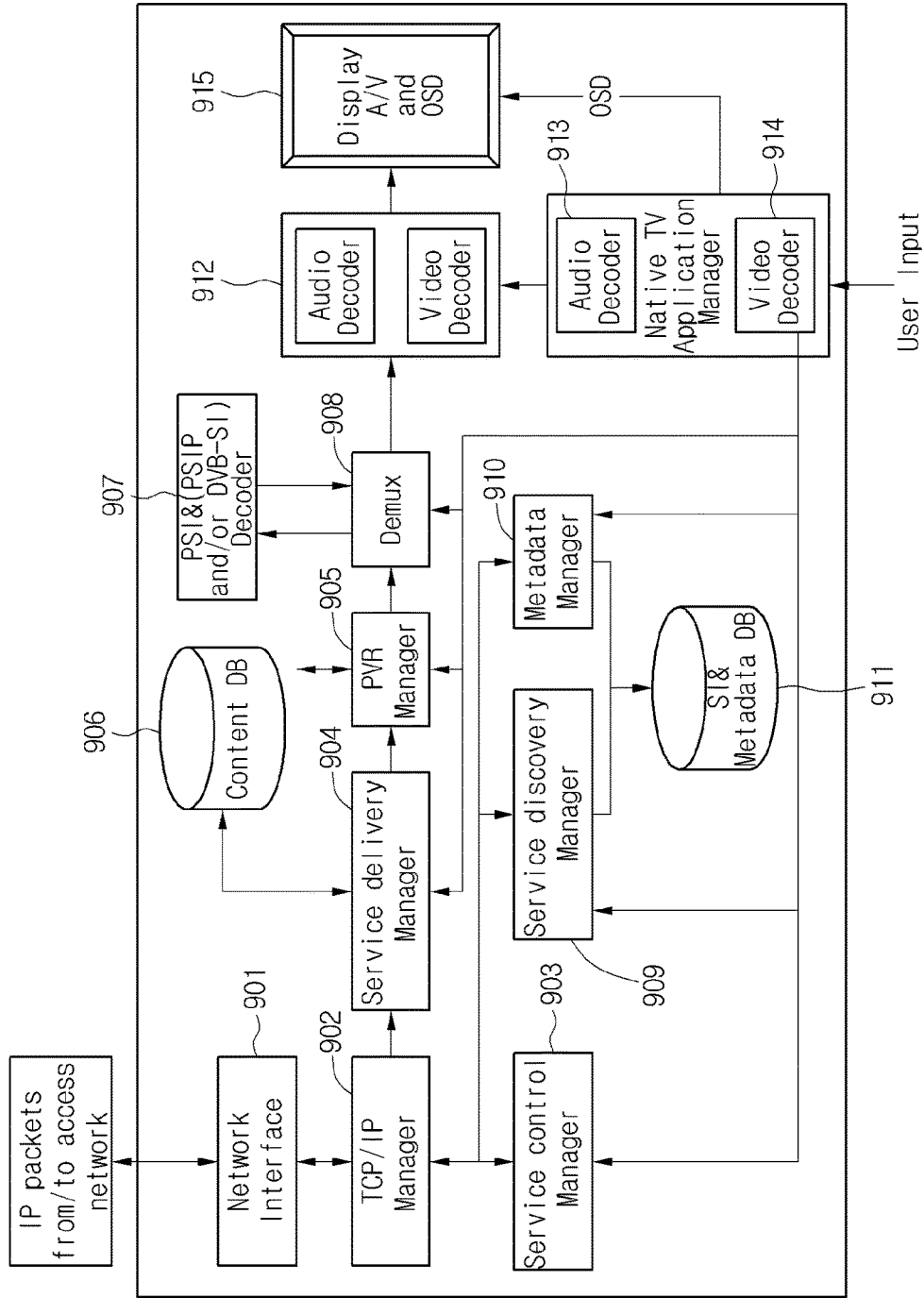
FIG. 14 is a block diagram of an IPTV receiver according to an embodiment.

FIG. 14 illustrates a configuration of an IPTV receiver according to an embodiment, as a block diagram.

The IPTV receiver according to the embodiment may include a separate tuner to be able to receive terrestrial broadcasting, cable broadcasting, satellite broadcasting, etc. For the convenience of description, the present invention describes on the basis of a configuration that receives IPTV services provided by an IP network.

Meanwhile, the acronym ITF indicates an open IPTV terminal function and may mean a receiver that includes functional modules required for supporting IPTV services.

The IPTV receiver may include a network interface unit 901, a TCP/IP manager 902, a service delivery manager 904, a PVR manager 905, a de-multiplexer 908, a data decoder 907, an audio/video decoder 912, an A/V display & OSD module 915, application manager 913 and 914, a service information (SI) metadata DB 911, a service discovery manager 909, a service control manager 903, a metadata manager 910, and a content DB 906.

Referring to FIG. 14, the network interface unit 901 receives and transports packets from/to a network. That is, the network interface unit 901 receives services and media contents from service providers through the network.

The TCP/IP manager 902 participates in delivering packets from sources to destinations that are received and transported by the IPTV receiver. In addition, the TCP/IP manager 902 classifies the received packets according to protocols and outputs the classified packets to the service delivery manager 904, service discovery manager 909, service control manager 903, and metadata manager 910.

The service delivery manager 904 is responsible for controlling the received service data. For example, if controlling real-time streaming data, RTP/RTCP may be used.

If the real-time streaming data is transported by using RTP, the service delivery manager 904 parses the received data packets according to RTP to transport them to the de-multiplexer 908 or store them in the content DB 906 according to the control of the service manager 914. In addition, the service delivery manager 904 feeds the information received from the network back to a service providing server side, by using RTCP.

The de-multiplexer 908 de-multiplexes the received packets to audio, video, program specific information (PSI) data, etc. and transports them to the audio/video decoder 912 and data decoder 907, respectively.

The data decoder 907 decodes service information, for example program specific information (PSI). That is, the data decoder 907 receives and decodes a de-multiplexed PSI section, program and service information protocol (PSIP) section, or DVB-service information (SI) section from the de-multiplexer 908.

In addition, the data decoder 907 decodes the received sections, and generates and stores a database on service information in the service information DB 911.

The audio/video decoder 912 decodes the video data and audio data received from the de-multiplexer 908. The audio and video data decoded from the audio/video decoder 912 is provided to users through the A/V display and OSD module 915.

The application manager manages the general conditions of the IPTV receiver, provides a user interface and manages the other managers. To that end, the application manager includes a user interface manager 913 and a service manager 914.

The user interface manager 913 provides a graphic user interface (GUI) for users by using an on screen display (OSD) and receives key input from users to perform the operations of the receiver according to the input. For example, if key input related to channel selection is received from users, the key input signal is transported to the service manager 914.

The service manager 914 controls managers associated with services, such as the service delivery manager 904, service discovery manager 909, service control manager 903, and metadata manager 910.

In addition, the service manager 914 generates a channel map and selects a channel by using the channel map according to the key input received from the user interface manager 913. In addition, the service manager 914 receives the service information of channels from the data decoder 907 and sets the audio/video packet identifier of the selected channel for the de-multiplexer 908.

The service discovery manager 909 provides information required for selecting a service provider that provides services. If a signal for channel selection is received from the service manager 914, the service discovery manager 909 searches for services by using the information.

The service control manager 903 is responsible for selecting and controlling services. For example, if a user selects a live broadcasting service such as a typical broadcasting technique, the service control manager 903 may select and control services by using IGMP or RTSP. If a user selects a video on demand (VOD) service, the service control manager may select and control services by using RTSP.

The RTSP protocol may provide a trick mode for real-time streaming. In addition, the service control manager 903 may initialize and manage sessions through an IMC gateway by using IP multimedia subsystem (IMS) and session initiation protocol (SIP). The protocols are examples and the other protocols may be used according to implementations.

The metadata manager 910 manages the metadata associated wit services and stores the metadata in the service information DB 911.

The service information DB 911 stores service information that the data decoder 907 has decoded, metadata that the metadata manager 910 manages, and information that the service discovery manager 909 provides and is required for selecting a service provider. In addition, the service information DB 911 may store setup data on systems.

The service information DB 911 and content DB 906 each may be implemented by using a non-volatile RAM (NVRAM) or a flash memory and may be implemented as two logically divided regions on the same storing region.

The PVR manager 905 is a module for recording and replaying live streaming contents and may collect metadata on the recorded contents and generate additional information to be provided to users, such as thumbnail images or an index.

The functions of the control unit of the IPTV receiver according to an embodiment may be divided and implemented into a plurality of modules, such as the TCP/IP manager 902, service delivery manager 904, PVR manager 905, application manager 913 and 914, service discovery manager 909, service control manager 903, and metadata manager 910.

For example, the TCP/IP manager 902 may filter SD&S information by using target package information as described above and control so that the network interface unit 901 requests a server only payload or a segment corresponding to a specific package (for example, a package that the IPTV receiver has joined) and receives it.

Alternatively, the TCP/IP manager 902 may filter the SD&S information received in a multicast scheme by using the target package information so that only payload or a segment corresponding to a specific package is parsed and processed by the data decoder 907.

Figure 15:
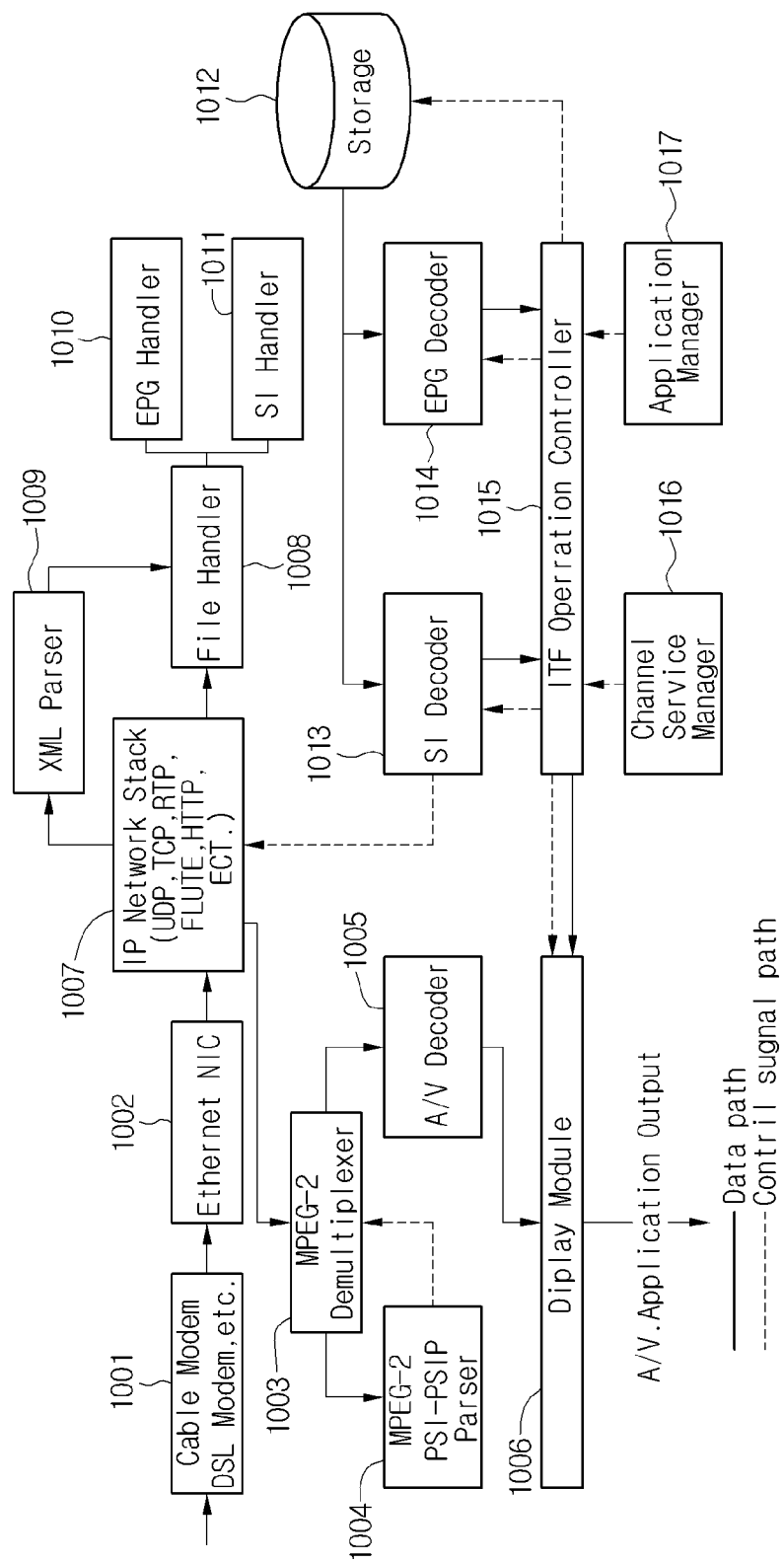
FIG. 15 is a functional block diagram of an IPTV receiver according to another embodiment.

FIG. 15 illustrates another embodiment of a configuration of an IPTV receiver according to the present invention as a block diagram and represents the functions of the IPTV receiver as functional blocks. The solid arrows illustrated in FIG. 15 correspond to data paths and the dotted arrows correspond to control signal paths.

Cable modem, DSL modem, etc. 1001 are interfaces for enabling ITF to be connected to the IP network and demodulate the signals transported through physical mediums to restore digital signals.

Ethernet NIC 1002 restores the signals received through the physical interface to IP data, and IP network stack 1007 processes each layer according to IP protocol stack.

Meanwhile, an XML parser 1009 parses XML documents among received IP data, and a file handler 1008 processes the data transported in a file type through FLUTE among the received IP data.

An SI handler 1011 processes a part corresponding to IPTV service information among the received file-type data and stores it in storage 1012, and an EPG handler 1010 may process a part corresponding to IPTV EPG information among the received file-type data and store it in the storage 1012.

The storage 1012 stores various data such as SI and EPG.

An SI decoder 1013 receives and analyzes SI data from the storage 1012 and acquires channel map information. An EPG decoder 1014 analyzes the EPG data stored in the storage 1012 and stores information required for configuring EPG.

An ITF operation controller 1015 is a main controller that controls the operations of the ITF, such as channel change or EPG display.

A channel service manager 1016 may perform operations, such as channel change according to user input and an application manager 1017 may perform application services, such as EPG display according to user input.

An MPEG-2 de-multiplexer 1003 may extract MPEG-2 transport stream data from received IP datagram and transport it to a corresponding module according to a packet identifier (PID).

In addition, an MPEG-2 PSI/PSIP parser 1004 may extract and parse PSI/PSIP data including the packet identifier of A/V data and connection information on a program element from the MPEG-2 transport stream.

Meanwhile, an A/V decoder 1005 decodes and delivers input audio and video data to a display module 1006, and the display module 1006 may output the decoded A/V data or application.

While methods and devices for transmitting/receiving media according to embodiments have been described where a media transport stream transmitted/received between the transmitting device 100 and receiving device 200 is MPEG-2 TS, the present invention is not limited thereto but may be applied to various transport stream formats other than the MPEG-2 TS.

The method of receiving the media TS according to the present invention as described above may be manufactured as a program for being executed on a computer and stored in a computer readable recording medium, and examples of the computer readable recording medium include read-only memory (ROM), random-access memory (RAM), CD-ROMs, magnetic tapes, floppy disks, optical data storage devices, and carrier waves (such as data transmission through the Internet).

The computer readable recording medium can also be distributed over network coupled computer systems so that the computer readable code is stored and executed in a distributed fashion. (Also, functional programs, codes, and code segments for accomplishing the present invention can be easily construed by programmers skilled in the art to which the present invention pertains.)

In addition, although exemplary embodiments have been illustrated and described above, the present disclosure is not limited specific embodiments described above but may be varied by those skilled in the art without departing from the subject matter of the present disclosure claimed in the following claims. Further, these variations should not be understood individually from the technical spirit or perspective of the present disclosure.

The invention claimed is:

1. A method of transmitting media content, comprising:
    obtaining a MPEG2 transport stream (TS) containing the media content;
    identifying a redundancy data of the MPEG2 TS;
    deleting the redundancy data in the MPEG2 TS;
    generating restoration information for restoring the deleted redundancy data; and
    transmitting the restoration information and the MPEG2 TS in which the redundancy data is deleted,
    wherein the restoration information comprises three pieces of information including section count information representing a count of data sections being consecutive by deleting the redundancy data in the MPEG2 TS, amount information for the deleted redundancy data which is prior to the data sections, and indicating information according to which a length of each data section varies.

2. The method of claim 1, wherein the deleting a redundancy data comprises:
    deleting a null packet which is contained in the MPEG2 TS.

3. The method of claim 1, wherein the deleting a redundancy data comprises:

deleting a syntax element which is included in a header of the MPEG2 TS.

4. The method of claim 1, wherein the deleting a redundancy data comprises:
deleting a stuffing byte which is included in the MPEG2 TS.

5. The method of claim 1, wherein the restoration information includes a quantity of the deleted redundancy data.

6. The method of claim 1, wherein a piece of the restoration information places in a packet header of the MPEG2 TS.

7. The method of claim 1, wherein the restoration information includes a sync byte which signals a deleted null packet.

8. The method of claim 7, wherein a value of the sync byte is 0xFF.

9. A device for transmitting media content, comprising:
a receiver for obtaining a MPEG2 transport stream (TS) containing the media content; and
a controller for identifying a redundancy data of the MPEG2 TS, deleting the redundancy data in the MPEG2 TS, generating restoration information for restoring the deleted redundancy data, and transmitting the restoration information and the MPEG2 TS in which the redundancy data is deleted,
wherein the restoration information comprises three pieces of information including section count information representing a count of data sections being consecutive by deleting the redundancy data in the MPEG2 TS, amount information for the deleted redundancy data which is prior to the data sections, and indicating information according to which a length of each data section varies.

10. The device of claim 9, wherein the controller deletes a null packet which is contained in the MPEG2 TS.

11. The device of claim 9, wherein the controller deletes a syntax element which is included in a header of the MPEG2 TS.

12. The device of claim 9, wherein the controller deletes a stuffing byte which is included in the MPEG2 TS.

13. The device of claim 9, wherein the restoration information includes a quantity of the deleted redundancy data.

14. The device of claim 9, wherein a piece of the restoration information places in a packet header of the MPEG2 TS.

15. The device of claim 9, wherein the restoration information includes a sync byte which signals a deleted null packet.

16. The device of claim 15, wherein a value of the sync byte is 0xFF.

17. A device for receiving media content, comprising:
a receiver for receiving the media content and restoration information which is used for restoring a deleted redundancy data of MPEG2 TS; and
a controller for restoring the MPEG2 TS using the media content and the restoration information, and playing the media content,
wherein the restoration information comprises three pieces of information including section count information representing a count of data sections being consecutive by deleting the redundanc data in the MPEG2 TS, amount information for the deleted redundancy data which is prior to the data sections, and indicating information according to which a length of each data section varies.

18. The device of claim 17, wherein the controller restores a null packet using the restoration information.

* * * * *